Sept. 27, 1966 J. A. MAASS 3,275,951
RING MODULATOR WITH LARGE DYNAMIC OPERATING RANGE
Filed Aug. 1, 1963
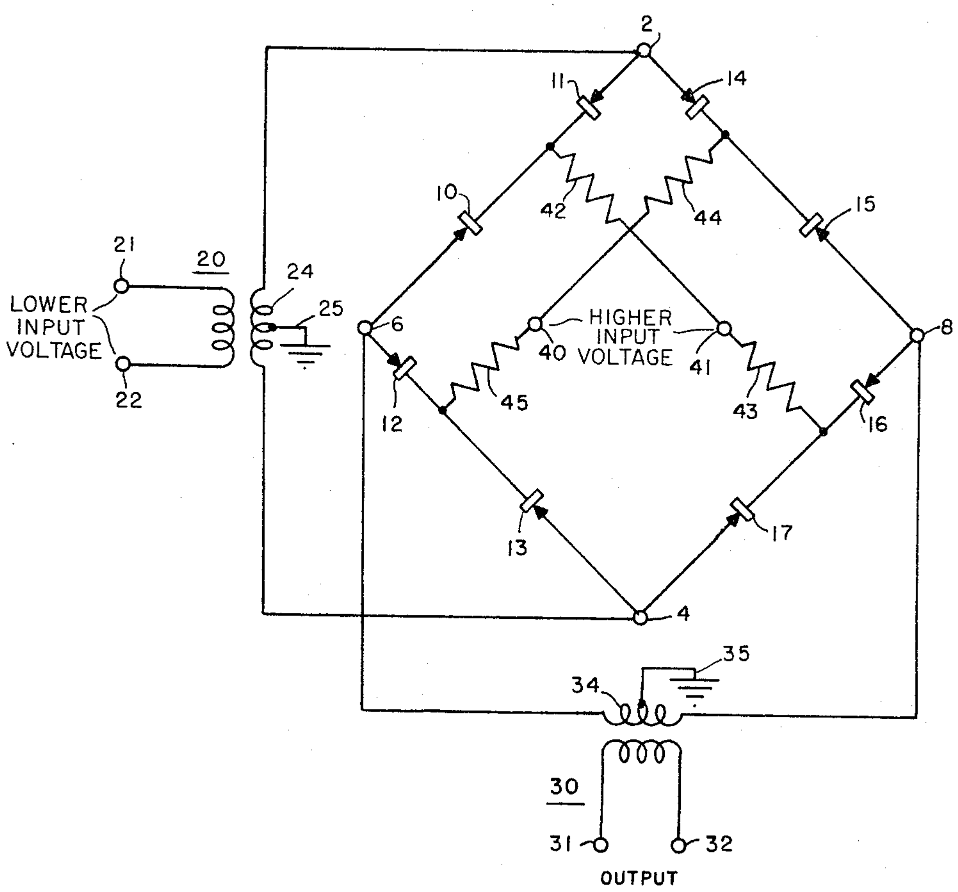
INVENTOR,
JOACHIM A. MAASS
BY Edward J. Kelly
ATTORNEY.

United States Patent Office 3,275,951

Patented Sept. 27, 1966

3,275,951
RING MODULATOR WITH LARGE DYNAMIC OPERATING RANGE

Joachim A. Maass, Wall Township, Monmouth County, N.J., assignor to the United States of America as represented by the Secretary of the Army Filed Aug. 1, 1963, Ser. No. 299,438
1 Claim. (Cl. 332—43)

The invention described herein may be manufactured and used by or for the Government for governmental purposes, without the payment of any royalty thereon.

This invention relates to modulators and particularly to ring modulators or phase-shift keyers.

In the conventional ring modulator, four diodes are connected as a bridge, in a ring, such that the anode of one diode is connected to the cathode of the following diode. Thus, current flow is possible in one direction only around the ring. Two transformers are provided with their secondary windings connected to the electrically conjugate pairs of bridge terminals, and their primary windings available for input or output connections. Center taps on both secondary windings provide for another input connection.

This last connection is used for the higher-voltage, alternating-current, input signal, which alternately commutates the conductive state of a pair of non-adjoining diodes in the ring. If the lower-voltage input signal is applied to one of the transformers—which then becomes the input transformer—the commutating action of the higher-voltage signal will cause polarity changes of the lower-voltage signal with reference to the other transformer—which then becomes the output transformer—through which an output signal is available.

If the higher-voltage input signal is a carrier frequency signal of a higher frequency, and the lower-voltage input signal is a modulating signal of a lower frequency, then, under normal operating conditions, and with perfect symmetry of all elements, an output signal will result which only contains the sum and the difference components of these two frequencies. That is, a double-sideband, suppressed-carrier, amplitude-modulated signal.

The restrictions on proper operation are imposed by the diode forward voltages and component symmetry. If, for example, the instantaneous polarity of the carrier-frequency signal causes two of the diodes to conduct heavily in an "on" condition while the other two diodes are in an "off" condition, since they are biased reversely; then the voltage, proportionally to the modulation signal which appears across the secondary of the input transformer, must be sufficiently small to not cause conduction of the "off"-biased diodes. This voltage, therefore, must be smaller than the forward voltage of a single diode, otherwise distrotion of the output signal will result.

In an extreme case the diodes which are biased reversely by the carrier frequency signal would become conductive and act as amplitude limiters for the modulating signal. The dynamic symmetry of all circuit components is required to prevent leakage of the carrier frequency signal into the output signal.

If the circuit is used for phase shift keying of a carrier frequency then the lower-voltage signal would have to be the carrier-frequency signal, and the higher-voltage signal would have to be the modulating signal and would usually be pulse information. The requirement that only the higher-voltage input signal determines the conductive state of diode pairs is the same as before.

In both modes of operation, the bandwidth is effected by the limiter action of the "off" diodes, if they are driven to conduction by excessive voltage of the lower-voltage input signal. The bandwidth is also effected by variations in the dynamic operating characteristics of the diodes, which may be caused by technological, environmental, or electrical influences—the most significant here being temperature and voltage.

Regardless, whether the circuit is used for amplitude modulation or phase-shift keying, any conduction of diodes, which are not switched into conduction by the higher voltage input signal, will result in distortion of the output signal; and any non-symmetry of components will result in carrier frequency leak-through into the output signal.

It is therefore an object of this invention to provide an improved ring modulator having a large, dynamic voltage range.

It is a further object of this invention to provide an improved ring modulator having a more constant bandwidth over a very wide range of modulating voltages.

These and other objects of this invention are accomplished by using 2 diodes, back-to-back in place of each of the separate, conventional diodes in a ring modulator. The larger of the input voltages is applied, through resistors, to the common back-connections of the alternate pairs of diodes. The smaller of the input voltages is applied to one of the diagonal pairs of terminals of the bridge, and the output is taken from the other of the diagonal pairs of terminals of the bridge.

This invention will be better understood and further objects of this invention will become apparent from the following specification and the drawing which shows a circuit diagram of a typical, ring modulator connected according to this invention.

Referring now to the drawing, the terminals 2, 4, 6, and 8 form the four diagonal corners of a ring-modulator bridge, and the pairs of diodes 10–11, 12–13, 14–15, and 16–17 are connected in a bridge configuration, with each of the pairs of diodes, connected back-to-back, replacing one of the diodes of the more conventional, diode, ring-modulator bridge.

The input terminals 21 and 22 for the lower-voltage input signal are connected to the primary winding of the transformer 20. The secondary winding 24 connects to one pair 2–4 of the diagonal terminals of the bridge.

The modulated output appears across the other pair 6–8 of the diagonal terminals. The actual output terminals 31 and 32 are connected to the secondary of the transformer 30 and the center-tapped primary is connected across the diagonal terminals 6 and 8 of the bridge.

In the conventional ring modulator, the higher-voltage signal would be applied between the center taps 25 and 35 of the transformer windings 24 and 34 respectively. In the modulator shown in the drawing, the higher-voltage, push-pull signal is applied between the terminals 40 and 41 symmetrically with respect to the center-taps 25 and 35, which are normally grounded. The terminal 40 is connected to the common back-to-back connection of the pair of diodes 12 and 13 through the resistor 45, and to the common back-to-back connection of the pair of diodes 14 and 16 through the resistor 44. The terminal 41 is connected to the common back-to-back connections of the pairs of diodes 10–11 and 16–17 through the resistors 42 and 43 respectively.

In operation, the lower voltage input signal is applied across the terminals 21 and 22, through the transformer 20, to the terminals 2 and 4 of the bridge. The bridge is normally balanced with respect to these terminals when no signal is applied across the terminals 40 and 41 and all of the diodes are at the same bias level.

When the higher-voltage input signal is applied across the terminals 40 and 41, the bias voltages applied to the diodes are changed and the pairs of diagonally opposing diodes are switched at the frequency of the higher-voltage signal. This causes an unbalance in the bridge such that the lower-voltage input signal appears across the terminals 6 and 8 but with its phase being reversed at the frequency of the higher-voltage input signal. This combination of the two input signals is applied to the winding 34 of the transformer 30, through which it is applied to the output termials 31 and 32.

Since a back-to-back connected pair of diodes can only be made conductive by a voltage equal to or greater than the sum of the forward and the break down voltage of a single diode, the lower-voltage input signal, between the electrically conjugate terminals 2 and 4, can have any voltage value up to twice the sum of the forward and the breakdown voltages of a diode pair without causing conductance of diodes which have been "off"-biased by the higher-voltage input signal.

A convenient means to adjust the bandwidth is available in the four resistors 42–45. With properly chosen component resistance values the diodes will have a negligible effect on the symmetry and on the bandwidth of the circuit.

In the typical modulator shown in the drawing, the cathodes of the diodes of each pair are connected together and through the resistors to one of the terminals of the source of higher-voltage input signal. However, it is obvious that the anodes of the diodes of each of the pairs can be connected together, and, through the resistors, to the terminals of the source of higher-voltage input signals. The cathodes would then be connected to the appropriate ones of the diagonal terminals 2–8 and the elements would still be symmetrical and the bridge would still be balanced until the bias—now applied to the anodes—is varied by the modulating signals. The function of the circuit would be the same as before.

The input transformer 20—and also the output transformer 30—may be replaced by any suitable four-terminal network that does not interfere with circuit operation.

A circuit which was built according to this invention with toroids of Q3 ferrite, having an outside diameter of .3 inch, as cores for transformers 20 and 30; with resistors 42–45 of 600 ohms; and with diodes of the type TMD 916 (or IN 916) provided phase shift keying of a 70 mc. carrier at a frequency in excess of 10 mc. and with several volts of output signal across a 75 ohm load. Matching and tuning elements were provided on the input of transformer 20 and on the output of transformer 30 in a manner well known in the art.

What is claimed is:

A ring modulator comprising eight similar diodes, each having anode and cathode electrodes the cathodes of a first and second of said diodes being connected together, the cathodes of a third and fourth of said diodes being connected together, the cathodes of a fifth and sixth of said diodes being connected together, and the cathodes of a seventh and eighth of said diodes being connected together; a first transformer having a primary winding and a secondary winding with a grounded center tap, one end of said secondary winding being connected to the anodes of said first and eighth diodes the other end of said secondary winding being connected to the anodes of said fourth and fifth diodes; a second transformer having a primary winding with a grounded center and a secondary winding, one end of said primary winding being connected to the anodes of said second and third diodes and the other end of said primary winding being connected to the anodes of said sixth and said seventh diodes; a first and second resistors connected in series between the cathodes of said first and second diodes and the cathodes of said fifth and sixth diodes; a third and fourth resistors connected in series between the cathodes of said third and fourth diodes and the cathodes of said seventh and eighth diodes; a first source of input signals connected across the primary winding of said first transformer; a second source of input signals connected between the junction of said first and second resistors and the junction of said third and fourth resistors, the voltage level of said second source of input signals being higher than the voltage level of said first source of input signals; and an output load connected across the secondary winding of said second transformer.

References Cited by the Examiner

UNITED STATES PATENTS

| | | | |
|---|---|---|---|
| 2,205,843 | 6/1940 | Caruthers | 332—47 |
| 2,609,495 | 9/1952 | Van Weel | 332—43 |
| 2,923,894 | 2/1960 | Thompson | 332—47 |
| 3,046,451 | 7/1962 | Kiesel. | |
| 3,127,564 | 3/1964 | Giger. | |
| 3,189,836 | 6/1965 | Podell. | |

HERMAN KARL SAALBACH, *Primary Examiner.*

P. L. GENSLER, *Assistant Examiner.*